United States Patent [19]

Steward et al.

[11] Patent Number: 4,476,599

[45] Date of Patent: Oct. 16, 1984

[54] FASTENER ORIENTING, TAPPING AND COLLECTION SYSTEM

[75] Inventors: John H. Steward, Bloomfield Hills; Harold A. Ladouceur, Livonia, both of Mich.

[73] Assignee: Multifastener Corporation, Detroit, Mich.

[21] Appl. No.: 395,410

[22] Filed: Jul. 6, 1982

Related U.S. Application Data

[62] Division of Ser. No. 151,549, May 20, 1980, Pat. No. 4,338,694.

[51] Int. Cl.³ .......................... B23G 1/18; B23G 11/00
[52] U.S. Cl. ............................ 10/139 WH; 10/162 M; 10/162 A
[58] Field of Search ............. 10/72 R, 72 T, 75, 86 R, 10/129 WH, 129 WJ, 133, 139 WH, 139 WJ, 162 R, 162 A, 162 M, 162 P, 166, 169

[56] References Cited

U.S. PATENT DOCUMENTS

| 1,944,653 | 1/1934 | Clouse | 10/129 WJ |
| 3,334,724 | 8/1967 | Steward | 10/169 X |
| 3,711,931 | 1/1973 | Ladoucheur et al. | 29/412 |
| 3,858,299 | 1/1975 | Woods | 29/56.5 |
| 4,229,126 | 10/1980 | Harrow | 10/139 WJ |
| 4,299,001 | 11/1981 | Cleary et al. | 10/133 |

FOREIGN PATENT DOCUMENTS 626196 7/1949 United Kingdom ........... 10/139 WJ 402436 2/1974 U.S.S.R. ...................... 10/129 WH Primary Examiner—E. Michael Combs
Attorney, Agent, or Firm—Cullen, Sloman, Cantor, Grauer, Scott & Rutherford

[57] ABSTRACT

A machine and method for continuously orienting and tapping fasteners such as pierce nuts with the nuts being advanced in face-to-face manner aligned on the machine feed path. The machine is operable in one mode, in combination with nut collection means, to receive strips of the nuts from the feed path in side-to-side array for delivery in installation-ready coiled strips to an installation assembly or the like. One embodiment of the collection means includes apparatus for collecting and dispensing the nuts in unconnected linear stacks. Tapping of the nuts is performed by the machine in a "reverse flow" or deferred manner just prior to the nuts being dispensed from the feed path with the tapped nuts maintained in face-to-face spaced array. The machine reverse flow tapping provides for burr clearance between the spaced nuts to thereby assure that tapping burrs will not improperly position the nuts obviating machine jamming and thread obstruction by such burrs. A continuous nut orienting apparatus is operative, upon receiving nuts aligned in face-to-face abutment but in random angular orientation, to provide successive nut rotational movement about the feed path in predetermined directions orienting the nuts in face-to-face abutting array.

6 Claims, 20 Drawing Figures

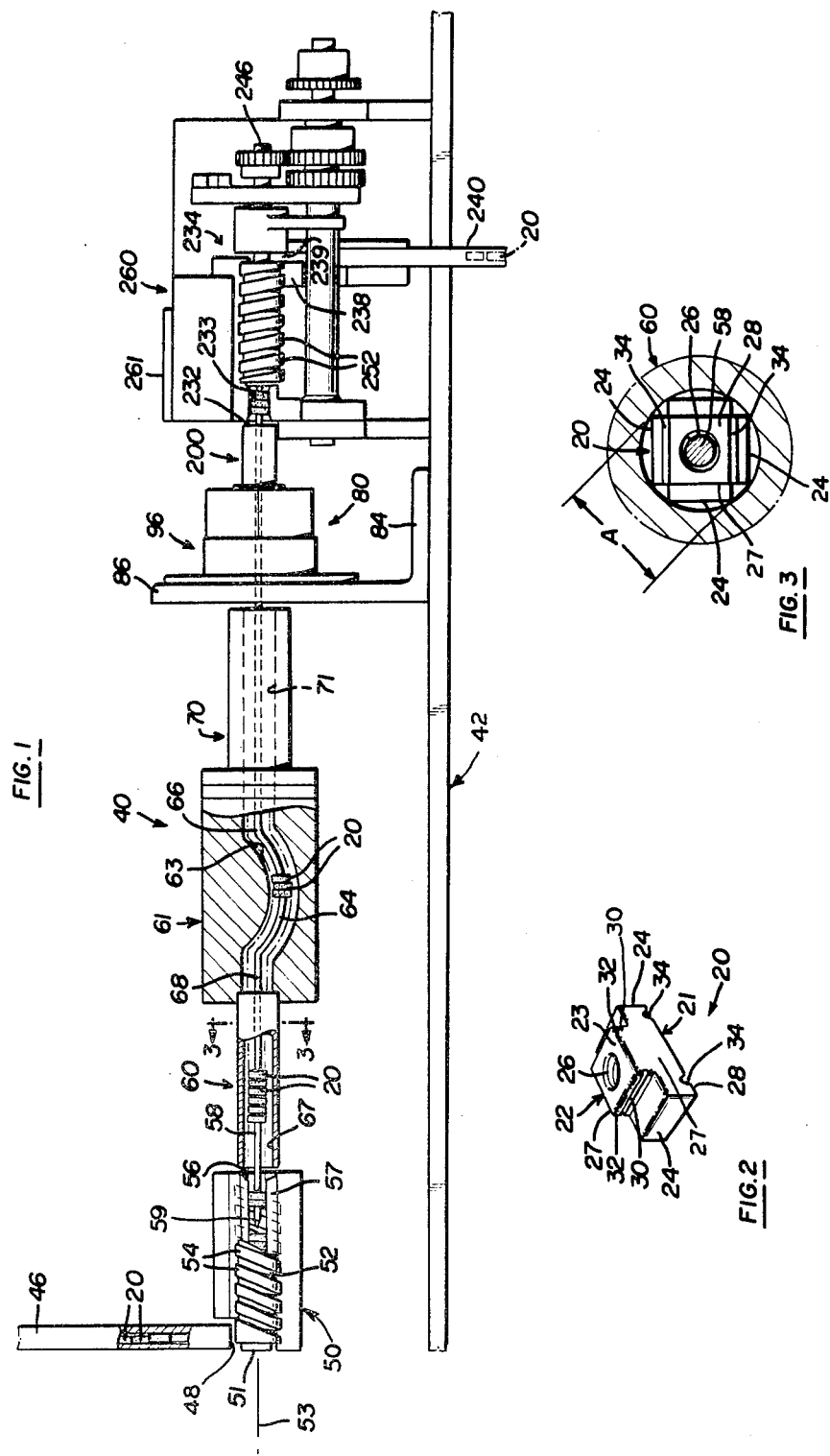

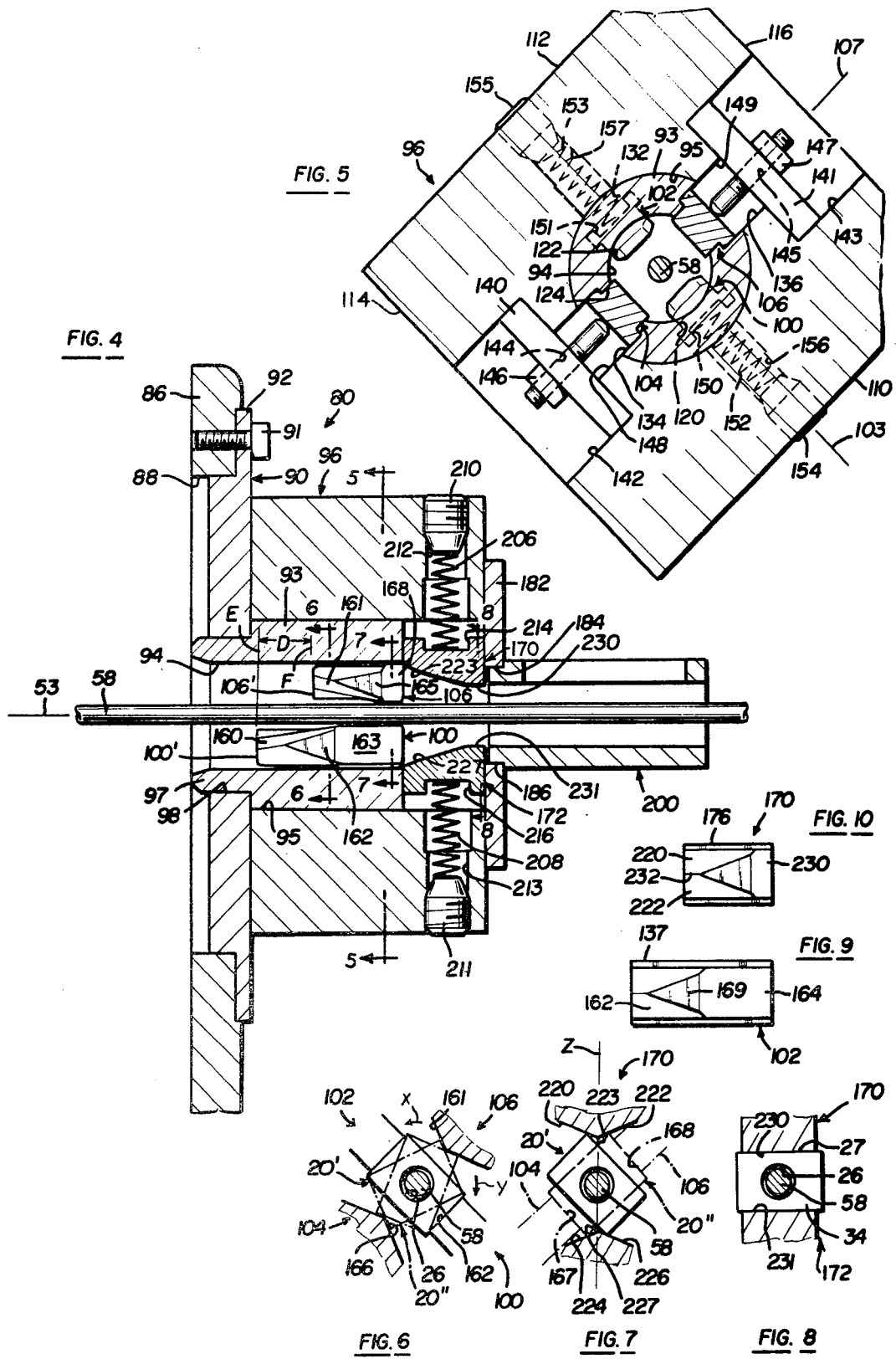

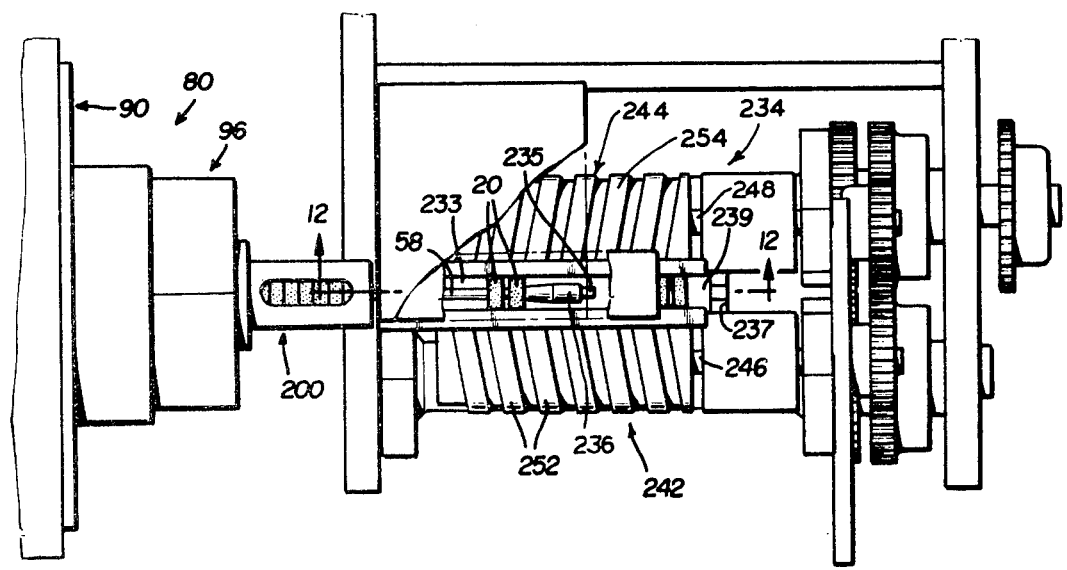
FIG. 11
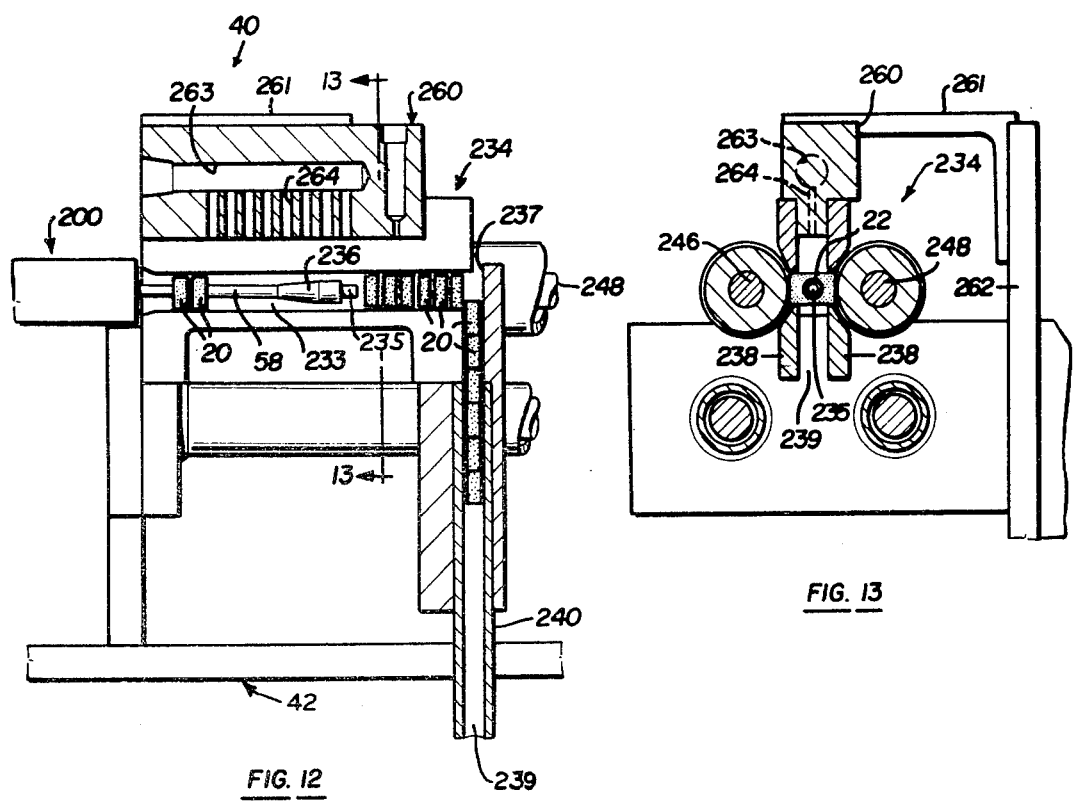
FIG. 12
FIG. 13

FASTENER ORIENTING, TAPPING AND COLLECTION SYSTEM

This is a division of application Ser. No. 151,549, filed May 20, 1980, U.S. Pat. No. 4,338,694.

FIELD OF THE INVENTION

This invention relates to fastener tapping and orienting machines and more particularly to a method and apparatus for orienting and tapping self attaching fasteners such as pierce nuts, clinch nuts, etc. More specifically, the invention in one form is directed to a combined continuous motion machine and method for orienting and tapping nuts by means of a deferred tapping operation performed at the discharge conveyor. The machine receives un-tapped self-piercing nuts which may be initially vertically disposed in longitudinal serial alignment, and discharges the tapped nuts in face-to-face spaced array. The nuts, upon being advanced from the machine, may be collected and retained as a coiled spiral strip or a linear stack in an installation-ready manner for subsequent delivery to nut installation head means.

By a continuous motion orienting and tapping machine it is meant that pierce nut fasteners or the like being processed by the machine are moved through the latter in a continuous procession at a substantially constant rate, the various operations being carried on while the fasteners are in uninterrupted motion. The machine of the present invention is thus operative in one mode to provide continuous orienting and tapping of the fasteners for feeding to an installation head. The machine is also operative in a non-continuous mode to allow the fasteners to be discharged and collected for delivery in installation-ready coiled strips or linear stacks to a fastener installation head. The invention contemplates the fasteners being collected and retained in either a connected or unconnected coiled manner.

DESCRIPTION OF THE PRIOR ART

Continuous tapping machines are known wherein fasteners, such as pierce and clinch nuts, are advanced along an established feed path of travel and aligned in a pilot face-to-bottom face alignment. The bore axis of each nut is in substantial coincidence with the feed path for sliding reception on a nut transport rod supporting a machine tapping tool. Rod rotation means are provided for rotating the tapping tool. The rod rotation tapping arrangement may be in the form of a crank-shank continuous tapper which requires that the pierce nuts transversing on the rod crank-shank portion rotate relative to the rotating rod. The resultant relative rotation between the nuts and the rod causes the nuts to undergo random angular orientation. As a consequence of such random orientation it has been the practice to remove nuts from continuous tapping machines for storage to await a subsequent nut orientation operation.

Another problem is that after being tapped the nuts are advanced in face-to-face abuttment on transport rod means with each nut serving as a driver for the next adjacent downstream nut. Thus, tapping burrs raised on the nuts are sandwiched between adjacent nuts preventing their flush contact causing eventual machine jamming. A related problem is that tapping burrs on one nut may be pushed or folded back into its threaded bore by an adjacent driving nut. The nut threads may be deformed or obstructed and fail inspection requiring their scrappage or a separate counter sinking operation by a nut deburring machine.

One form of such nut orientation involves rods or wires interconnecting or bridging the nuts to form a continuous pre-oriented strip of fasteners with the nuts aligned in longitudinal serial array. This allows the nuts to be coiled around a reel or spool for installation in various panels by a fastener installation head requiring high speed intermittent feeding. An example of a dual wire pre-orienting method is disclosed in U.S. Pat. No. 3,711,931 of Ladouceur, et al, assigned to the Assignee of the present invention, the disclosure of which is incorporated by reference herein. An example of an installation head is shown in U.S. Pat. No. 3,971,116 of Goldsmith, et al, assigned to the Assignee of this invention, the disclosure of which is also incorporated by reference herein. The present invention is designed to solve some of the problems in the above mentioned fastener tapping systems including the elimination of a separate nut orientation step and the elimination of a deburring operation to remove tapping burrs while also assuring against machine jamming.

SUMMARY OF THE INVENTION

The machine and method of the present invention for continuously orienting and tapping fasteners is particularly adapted to process pierce and clinch nuts of the types disclosed in the above mentioned patents. The machine includes input or nut receiving conveyor means, such as a dual screw journal conveyor, which may receive nuts from a vertically disposed loading passage, cartridge, or the like, in longitudinal serial alignment with the nuts' planar sides in abutting relation. The input conveyor receives and separates the nuts for advancement in substantial continuous succession on an established longitudinal axis defining a feed path, with the nuts being aligned in face-to-face longitudinally spaced array.

Elongated transport rod means, substantially aligned on the feed path, includes an upstream free end portion operative for the sliding reception in the bore of each nut as the nuts are advanced by the input conveyor means. The transport rod means extends downstream from the input conveyor means through serially arranged rod rotation means and nut alignment means for termination in discharge conveyor means. Cylindrical nut passage means are provided for receiving the transport rod means in a substantially concentric manner along the machine flow path for advancement to the rod rotation means. The cylindrical passage means has an internal diameter sized such that the nuts journally support the transport rod means on the machine feed path. By virtue of this arrangement, the transport rod means is rotated by the rod rotation means to allow a tapping tool, supported on the rod means, to rotate therewith and tap the nut bores as the nuts are advanced thereon by the machine conveyor means.

It is an important feature of the present invention to provide a continuous motion orienting and tapping machine and method for pierce nut fasteners, for example, wherein the nuts are tapped just prior to their discharge from the machine to avoid machine jamming and fastener rejection problems associated with fasteners being processed at high volume rates. In the disclosed reverse flow tapping arrangement pierce nuts, oriented in face-to-face abutting array, are advanced from the orienting station by machine conveyor means which longitudinally separates the nuts before their being tapped and removed from the machine feed path in spaced array. The longitudinal spacing between the nuts provides for clearance of burrs raised as a result of the tapping operation. Thus, any sharp edges or burrs raised above the nut faces as a result of the threading tap are not folded back into the threaded bore by contact with a juxtaposed driving nut obviating the obstruction of the bore threads. Heretofore, burr portions sandwiched between adjacent nuts prevented such nuts from being advanced on the transport rod in flush face-to-face driving contact creating machine jamming along the feed path. One solution to this nut burring problem requires a costly additional bore countersinking operation by a burring machine to remove the burrs.

The present invention provides a tapping machine and method wherein fasteners such as pierce nuts are advanced on the machine feed axis in face-to-face abutting relation with the nuts in random angular orientation, including a continuous orienting apparatus on the machine aligning opposed sides of the nuts in common parallel planes. The orienting apparatus provides first and second opposed pairs of cams operative to initially rotate the advancing randomly arranged nuts in either a first or second rotational direction to complementary oblique angular orientations. A third pair of opposed downstream cams rotate each successive nut from its initial oblique orientation through an additional predetermined angle aligning advancing nuts in face-to-face abutting array with their opposed sides in common parallel planes.

In a preferred embodiment the invention provides orienting, tapping and collecting strips of fasteners such as pierce nuts, for example. The untapped nuts are advanced on the machine feed path in face-to-face abutting relation on transport rod means with the nuts in random angular orientation. The machine, upon orienting and tapping the nuts, feeds strips of nuts to collection means with the nuts retained in a ready-installation manner for later feeding in strips to attaching means.

An important feature of the invention is to provide a machine as set forth above wherein strips of nuts are collected, retained and subsequently advanced to installation means in an unconnected manner eliminating bridging wire connectors or the like between the nuts.

Another feature of the present invention includes linear nut collection, retaining and delivery apparatus providing elongated linear support means for the reception of the bore of each nut of a stack of nuts being advanced in face-to-face array from the nut orienting and tapping machine. A guide portion is supported on the free end of an elongated cantilevered support with the guide receiving the bight portion of a wire loop. The wire loop includes return portions adapted to extend along the cantilevered support through a nut advancement member aperture. The nut advancing member is reciprocally movable along the wire loop and its support. The wire portion is adapted to be reeled from wire dispensing means such as a coil of wire. The second wire return portion extends along the support means with its free end attached to the nut advancement member. Upon the coil of wire being rotated in one wire take-up direction the advancement member is caused to move toward the guide to automatically dispense the stack of nuts from the chute to nut installation means.

Other advantages, objects and meritorious features of this invention will more fully appear from the following description of the preferred embodiment, claims and accompanying drawings.

BRIEF DESCRIPTION OF THE DRAWINGS

FIG. 1 is a side elevational view partly in section of an illustrative fastener continuous feeding, orienting, tapping and discharging machine embodying the present invention;

FIG. 2 is a perspective side elevation of one embodiment of the fastener nut for use with this invention;

FIG. 3 is an enlarged vertical sectional view taken on line 3—3 of FIG. 1;

FIG. 4 is an enlarged vertical sectional view of the fastener continous orienting apparatus of the present invention;

FIG. 5 is a vertical sectional view taken substantially on the line 5—5 of FIG. 4;

FIG. 6 is a vertical diagramatic view taken partially in the plane of line 6—6 of FIG. 4, showing portions of the camming means of the present invention;

FIG. 7 is a vertical diagramatic view taken partially in the plane of line 7—7 of FIG. 4 and detailing certain fasteners adapted to cooperate with the camming means of the present invention;

FIG. 8 is a diagramatic fragmentary sectional view taken substantially in the plane of line 8—8 of FIG. 4;

FIG. 9 is an enlarged detail view of a cam member of the first camming means;

FIG. 10 is an enlarged detail view of the cam face of the third camming means upper cam member;

FIG. 11 is a top elevational view, partly in section, with parts broken away taken in the plane of line 11—11 of FIG. 1;

FIG. 12 is a vertical sectional fragmentary view taken substantially in the plane of line 12—12 of FIG. 11 showing the output conveyor of the machine;

FIG. 13 is a vertical sectional fragmentary view taken on the line 13—13 of FIG. 12;

DESCRIPTION OF THE PREFERRED EMBODIMENTS

Figure 14:
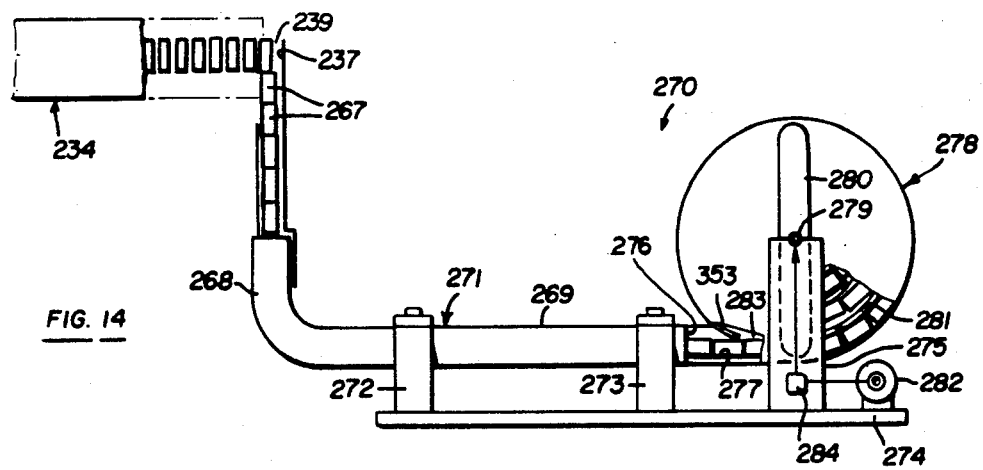
FIG. 14 is a partial view of the discharge conveyor of FIG. 1 together with a partially schematic representation of one form of unconnected nut collection reel apparatus.

As described above the combined fastener tapping and orienting continuous motion machine of the present invention is particularly adapted to tap and orient fasteners or nuts of the type shown in the above mentioned Ladouceur et al U.S. Pat. No. 3,845,860. Reference may be made to this patent for specific details of the pierce nut which is not disclosed herein, including one method wherein a continuous strip of the fasteners is rolled in coil form on a nut coil spool for delivery to an installation station.

Before proceeding with the description of the continous orienting and tapping machine of the present invention, a pierce nut 20 illustrative fastener will be briefly and generally described. As shown more particularly in FIG. 2 the pierce nut 20 including a body portion 21 and a reduced pilot portion 22 having a polygonal top pilot or piercing face 23, which in the disclosed form is generally rectangular. The nut body portion 21 includes a pair of oppositely extending flange portions 24 at the body portion bottom face 28, one flange extending from each end thereof. A central aperture or bore 26 extends through the nut body perpendicular to the plane of the polygonal faces 23 and 28 including the flange portions 24. The fastener sides 27 in the disclosed form are generally flat or substantially planar and perpendicular to the pilot face 23.

As described in the U.S. Pat. No. 3,187,796, the pierce nut pilot face 23 is adapted to pierce its own hole in a panel, wherein the nut serves as the punch, and is forced through a panel or plate to form its own hole. The nut 20 is provided with its own grooves 30, located between the top of the flange portion 24 and the nut pilot face 23, into which the panel is deformed by a die operation to receive the nut to the panel in a single stroke of a press. The grooves 30 define shoulders 32 which provide the piercing edges of the nut. In the disclosed double wire embodiment of the fastener a pair of linear grooves 34 (FIG. 3) are defined in the bottom face 28 of the nut, generally perpendicular to the axis of the aperture or bore 26 and the sides 27, and parallel to the panel receiving grooves 30. The retainer grooves 34 are adapted to receive and secure retaining wires or rods, as described hereinbelow.

Referring now more particularly to FIG. 1, the illustrative continuous orienting and tapping machine 40 is shown including a base 42. The machine is adapted to receive a supply of fasteners such as the pierce nut 20 illustrated in FIG. 2. The nuts are stacked in longitudinal serial or side-to-side abutting alignment in a vertically disposed loading passage such as chute 46 of generally rectangular configuration for guiding and dispensing the nuts through a bottom opening 48 from which they are successively withdrawn by gravity and loaded on input conveyor means such as a continously rotating screw drive input conveyor 50.

The input conveyor 50 in the disclosed form is substantially identical to output conveyor means, shown in FIGS. 11 and 12, to be described. Suffice is to say the input conveyor includes a pair of rolls being shown at 51 and 52 rotating on parallel shafts (not shown) in a given horizontal plane which includes the machine feed axis or path 53. The rolls 51, 52 have helical square shaped thread surface formations 54, which are rotated in opposite directions. In a conventional manner the opposed threads 54 are arranged to engage the nut flanges 24 locating each nut bore axis in substantial coincidence with the feed axis 53, whereby the nuts are successively advanced by the input conveyor in face-to-face aligned spaced array.

The nuts are successively advanced downstream transferred to longitudinally disposed upper and lower feed plates 56 and 57 including therein elongated transport rod means 58 having its upstream lead-in end portion 59 aligned on the feed axis 53 between the conveyor rolls 51, 52. In FIG. 3, the nuts 20 are shown arranged on the transport rod means 58 in a substantially continuous pilot face-to-bottom face manner, with the pilot face 23 trailing and the bottom face 28 leading the direction of downstream travel. It will be noted, however, that the invention contemplates the nuts being reversed, i.e., with nut bottom face 28 trailing and nut top pilot face 23 leading.

The nuts 20 are transported along the feed axis 53 in an upstream tubular cylinder 60 for transfer to a continuous rod rotation means indicated generally at 61, the details of which do not form a part of the present invention. Suffice to say that the diagramatically shown continuous rod rotation means 61 is in the form of a "crank shank" continuous tapper including an outer rotatable spindle member 62 defining passage means 63 enclosing a central curved transport rod crank portion 64 with its leading or downstream shank end 66 and its trailing or upstream shank end 68 positioned in substantial coincidence with the feed axis 53 of the machine. When the machine 40 is in operation, the spindle 62 is rotated on the feed axis 53 and the drank portion 64 is simultaneously rotated around the feed axis 53. The abutting nuts 20 are advanced along the upstream shank end portion 68 and snaked around the curved crank portion 64 to the downstream shank end portion 66.

The rod means 58 is shown supported in tubular portion cylindrical passage means in journal-like manner by the nuts 20, as seen in FIG. 3. That is, the maximum diagonal dimension of the nuts, indicated by dimension "A" is slightly less than the internal diameter "B" of annular passage 67. A corresponding relation exits between the passage means 63 of spindle 62 and the crank portion 64. As a consequence rotation of spindle 62 causes rotation of the crank portion 64 about the feed axis 53 rotating the rod means 58.

It will be noted that the nuts 20, are discharged from the continuous rod rotation means 61 aligned in face-to-face abutting sequence but with their sides 27 randomly angularly positioned or oriented about the feed axis 53. An output or downstream tubular portion or cylinder 70 of the rotation means 61 includes downstream cylindrical passage means 71 which encloses transport rod means 58 aligned on the feed axis 53. The transport rod means 58 successively receives the advancing nuts means 58 from: downstream shank end 66 of crank rod portion 64 for advancement of the nuts into a continuous nut orienting apparatus 80 of the present invention shown incorporated with the machine 40.

Turning now to FIG. 4 it will be seen that the continuous nut orienting apparatus 80 is supported on base 42 by a main frame angle member or bracket 82 including a horizontal flange portion 84 (FIG. 1) and a vertical flange portion 86. The bracket 82 rests on and is secured to the base 42 by screws (not shown) with its vertical portion apertured at 88 in which a mounting bushing 90 is anchored to flange portion 86 by bolts 91 extending through the bushing annular mounting collar 92.

Essentially, the nut orienting means 80 are carried at a downstream location relative to the bushing 90. An initial portion of the nut orienting means is supported by and contained within axially disposed cylindrical orienting tubular frame 93, having a chamber or passage 94. The tube 93 is telescopically received within axial bore 95 of support housing or body 96. The body 96 is mounted on plate bushing 90 by bolts (not shown) with a spindle portion 97 of orienting tube 93 extending through bushing opening 98.

As seen in FIGS. 4 and 5 first front camming means, in the form of a first or front pair of mirror image cam finger members 100 and 102, are supported in orienting tubular frame 93 in diagonally opposed relation with the cam members symmetrically located on a longitudinally extending, 45° oriented plane 103 including the machine feed axis 53. Second intermediate camming means in the form of a second pair of mirror image cam fingers or members 104 and 106, are supported in frame 93 in diagonally opposed relation, 180° removed from the first pair of cam members 100, 102. The cam members 104 and 106 are shown symmetrically located on longitudinally extending, 45° oriented plane 107 which also includes the axis 53. The body 96, in the preferred form, is substantially square in transverse vertical cross-section with its opposed side faces 110 and 112 positional at 45° angles to the vertical. Similarly, the body opposed side faces 114 and 116 are positioned at 45° angles to the vertical.

Each pair of the cam members 100, 102 and 104, 106 are generally block-like in configuration adapted to be positioned in longitudinally extending stepped guide slots in frame 93. The slots, are shown at 120 and 122, for cam members 100 and 102 respectively and at 124 and 126, for cam members 104 and 106 respectively. Each of the stepped guide slots 120, 122, 124 and 126 has an enlarged outer portion 130, 132, 134 and 136, respectively defining longitudinally extending paired slot shoulders upon which their associated cam members 100, 102 and 104, 106 are supported by side rails such as 137 in FIG. 9 for interlocking with tubular orienting frame 93. The cam members are sized for radial sliding movement so as to be located in the chamber 94 with their working cam faces at a predetermined radial distance from the feed axis 53.

It will be noted in FIG. 5 that each of the opposed intermediate cam members 104 and 106 have associated therewith a cam plate 140, located in outer rectangular sectioned slots 142 and 143 respectively, adapted for flush engagement with its associated slot face of the body 96. Each cam plate 140, 141 has a threaded aperture 144 and 145 respectively. Each cam member 104, 106 is adapted to have its cam rails positively retained on its associated slot shoulders, by means of adjustable, oval pointed, stud bolts indicated at 146 and 147 extending into radial bores 148 and 149, respectively.

Each of the opposed front cam members 100 and 102 has a blind bore 150 and 151 formed in the outer side thereof operative to capture the inner end of biasing spring means in the form of helical compression springs shown at 152 and 153, respectively. Each of the springs 152 and 153 has its outer end engaged by a hollow head set screw 154 and 155 threaded in an associated bore 156 and 157 capturing the outer end of its associated coil spring 152 and 153, respectively. By this arrangement, each front cam member 100 and 102 is individually radially biased inwardly in a resilient, floatably mounted manner in its associated guide slot accommodating to machine jamming situations.

It will be noted in FIG. 4 that cam member 100 has its cam face 160 lead edge 100' aligned in a first given transverse plane indicated by construction line "E" while second cam member 106 has its face cam 161 lead edge 106' aligned in a second given transverse plane indicated by construction line "F". FIG. 3 shows that plane of line "F" intersects the first cam member 100 in the region of triangular lead-in cam face 162. Further, the cam member 100 has a positioning or nut retaining rectangular face 163 which, with its opposed paired cam member 102 rectangular retaining face 164 (FIG. 9) successively engages nuts of a first group of nuts 20' (FIG. 6). The nuts 20' are rotated in a first direction "X" for retention at a first oblique angle of about 45°.

At substantially the same time the second pair of cam members 104 and 106 triangular lead-in cam faces, indicated by face 165 of cam member 106, successively engage nuts of a second group of nuts 20". The nut retaining faces 163 and 164 of the first pair of cam members 100 and 102 respectively, longitudinally override the came faces 166 and 161 of the second pair of cam members 104 and 106. This insures that each first group nuts 20' is retained at its initial predetermined oblique angle during the rotational orienting movement of the next adjacent abutting upstream nut. FIG. 9 shows front cam member 102 with a triangular transition cam face 169 corresponding to face 162 of cam member 100.

The second pair of cam members 104 and 106 are designed to substantially simultaneously contact a second group of nuts diagonally opposed leading edge portions and rotate same in a second rotational direction "Y" (FIG. 6). This initially orients each second group nut at a second initial predetermined oblique angle, shown at 20" in FIG. 7 to be about an angle of 45°. It will be noted that the initial oblique angle position of each nut 20" is complementary to the initial oblique angle each of nut 20'. The nut 20" is momentarily retained at the second oblique angle because its one planar side 27 is in flush sliding contact with inclined longitudinally extending rectangular retaining face 167 of cam member 104 and its opposed planar side 27 being in flush sliding contact with inclined longitudinally extending rectangular face 168 of diagonal cam member 106. Thus, in the case where two successive random nuts are rotated in opposite directions (FIG. 6), the nuts 20' and 20" will be initially oriented about the feed path or transport rod 58 in complementary 90° relation (FIG. 7).

As best seen in FIGS. 4 and 5, the continuous orienting means further includes third camming means in the form of a third back pair of substantially identical mirror image upper and lower cam members 170 and 172 shown movably supported on the trailing or downstream end 174 of the orienting tubular frame 93. In the disclosed form the cam members 170 and 172 are retained by means of interlocking side rails 176 (FIG. 10) engaging cooperating shoulders (not shown) in tubular orienting frame 93 in the same manner as cam members 100 and 102. A vertically disposed plate 182 has a rectangular aperture 184 for reception of notched end portion 186 of rectangular sectioned nut aligning channel or chute 200.

Thus, the third pair of cam members 170 and 172 are floatably mounted under the influence of upper and lower resilient biasing means in the form of compression coil springs shown at 206 and 208, respectively, to reciprocate vertically from an innermost location to an outwardly retracted position. Each coil spring 206 and 208 has one outer end suitably retained by set screws 210 and 211 respectively, threadably received in opposed bores 212 and 213. The inner ends of the coil springs are telescoped in aligned blind bores 214 and 216 of the cam members 170 and 172, respectively. Thus, the vertically opposed back cam members 170 and 172 are floatably supported such that the springs 206 and 208 bias the members 170 and 172 into precise orienting contact with each successive first and second obliquely positioned nut. The floating cam members 170 and 172 accommodate to machine jamming situations in the manner of cam members 100 and 102.

As seen in FIGS. 4, 7 and 10, each of the diametrically opposed cam members 170 and 172 includes upper and lower paired, camming faces 220, 222 and 224, 226 respectively, symmetrically disposed relative to the vertical plane "Z" of the feed axis 53. It will be noted that the upper pair of beveled cam faces 220 and 222 converge inwardly and in the upstream direction of nut travel to define a cam edge 223 aligned in plane "Z". In a mirror image manner the lower cam faces 224 and 226 converge inwardly and in the upstream direction of nut travel to define a lower cam edge 227.

The two intersperced nut groups initially oriented at either a first or second oblique angle of FIG. 7, are advanced downstream for engagement by the third pair of camming means. As a result each successive nut is rotated by the converging upper and lower cam faces of cam members 170 and 172. That is, each nut to be rotated about the feed axis 53 in either a first or second rotational direction from its respective first 20' or second 20'' oblique angular orientation (FIG. 7) to a predetermined single orientation (FIG. 8) with its opposed sides 27 disposed, respectively, in given parallel planes.

As seen in FIGS. 4 and 8 the third cam members 170 and 172 include a second pair of upper and lower horizontally disposed parallel trailing nut retaining surfaces 230 and 231 operative to engage and maintain the opposed planar sides 27 of each nut in common substantially horizontally disposed planes.

With reference to FIGS. 1 and 4 it will be seen that the nuts are successively advanced in continuous face-to-face abuttment and in uniform angular orientation or array from the cam surfaces 230 and 231 aligned with the feed chute 200 horizontally disposed upper and lower walls. The nuts, supported on the transport rod means 58, exit the open downstream end 232 of chute 200 and continue on the feed path into the aligned nut receiving and spacing passage 233 of discharge conveyor means in the form of continuous screw driven discharge conveyor 234.

FIGS. 11 and 12 show the transport rod means 58 with its downstream free end portion 235, terminating in the discharge conveyor passage 233, having tapping means generally indicated at 236, located thereon. The discharge conveyor 234 cooperates with the thread tapping tool means in that it receives untapped nuts in face-to-face abutting array at its input upstream end and longitudinally spaces the nuts prior to their being advanced to the tapping tool means 236. It will be noted that the pitch of the tap 236 must be equal to or a multiple of the pitch or lead of the threads on the rolls 244.

Upon the nuts being internally threaded they are advanced from the tapping tool means 236 for movement by the conveyor 234 to the vertical end face of abuttment wall 237 defining, with conveyor lateral guides 238, a vertically disposed discharge passage 239. The nuts are successively received in passage 239 for gravitational flow in longitudinal spaced side-to-side serial alignment into a vertically disposed nut receiving chute 240. The chute 240 is of rectangular section operative to maintain the nuts in longitudinal strips i.e., the nuts serially aligned in side-to-side relation with their side walls 27 abutting and the grooves 34 coaxially aligned.

As seen in FIGS. 11, 12 and 13, the discharge conveyor 234 is similar to the input conveyor 50 and includes a pair of longitudinally disposed rolls, shown at 242 and 244, rotating on parallel axis or shafts 246 and 248 in a plane parallel to the feed axis 53 and on either side thereof. The rolls 242 and 244 have helical surface formations with square threads 252 and 254, respectively, rotated by their associated rolls in opposite directions. As with input conveyor 50 the opposed square threads are arranged so that their grooves engage the nut flanges 24 whereby the nuts are removed from the downstream free end portion 235 of transport rod means 58.

It is a feature of the present invention to locate the tapping tool means in the form of the threading tap 236 on the downstream free end portion 235 of the transport rod means to provide deferred or reverse flow tapping. The discharge conveyor 234 cooperates with the tap 236 in that the conveyor receives untapped nuts in face-to-face abutting array and longitudinally spaces the nuts before their being advanced to the tapping means. As a result the threading tap 236, which includes a lead-in taper portion and a final tap portion, internally threads the nuts in their spaced mode of advancement with the nuts being gravitationally withdrawn from the machine feed path by escapement through vertical passage 239.

The invention utilizes the discharge conveyor spacing to accomplish reverse flow tapping of the nuts which, in the machine shown, is a penultimate tapping operation just prior to the successive discharge of the nuts. This is to be contrasted with conventional initial tapping wherein the tapping tool means are normally located on the upstream free end portion 59 of the rod means 58. It has been found that rough or sharp burr edges, raised by the tapping tool, may extend from the nut faces at the threaded bore. The raised burrs prevent the nuts from being properly aligned in flush face-to-face abutting driving relation in the crank rotation means 61 and result in machine jamming. Driving contact between tapped nuts may also cause adjacent nuts to push or fold the sandwiched burr portions into their associated nut threaded bores deforming or obstructing the threads such that they fail inspection. These nuts either require a separate deburring operation or must be scrapped.

It will be noted in FIGS. 11, 12 and 13 that tapping oil cooling means are provided in the form of an oil flow block, generally indicated at 260, supported by an angle bracket 261 extending from vertical machine support upright 262. A coolant oil flow passage 263 extends longitudinally through the block 260 to supply oil to a series of vertically disposed nozzle means 264 aligned on the feed axis above the tapping tool means.

Turning now to FIG. 14, nut strip collection means are provided in the form of a receiving, storing and feeding apparatus shown generally at 270. The apparatus includes a nut delivery chute 271, formed of suitable flexible plastic material such as polyethelene shown and described in U.S. Pat. No. 3,858,299 issued to Woods and assigned to the assignee of the present application. The chute 271 receives nuts 267 in side-to-side abutting array from the discharge passage 239 by means of a vertical portion 268 which portion communicates with a linear chute horizontal portion 269 receiving the nuts by gravity flow. The chute 271 is supported in guides 272 and 273 secured to base support 274. A riser or vertical support 275 is shown on base support 274. The chute 271 terminates in outlet 276 abutting a tangentially extending feed passage portion 277 of a nut storage spool 278 supported on riser 275 by means of spool shaft 279.

A motor driven magnetic nut pick-up means in the form of arm 280 is shown supported on shaft 279. In the embodiment of FIG. 14, the nut storage spool 278 includes a spiral track 281 operative to receive the unconnected nuts therein in side-to-side coiled serial array from chute outlet 276. The nuts 267 are gravity fed by chute through spool tangential passage portion 277 to the radially outer access opening 283 of the spiral track at the lowest point or nadir of the spool for pick-up by the motor driven magnetic arm 280. The spool in this embodiment is stationary. Arm 280 is operative to be rotated on shaft 279 by a motor 282 and slipping clutch mechanism 284 in a first counter-clockwise direction to advance the nuts and load the spiral track 281. It will be noted that the magnetic pick-up means could be in the form of a rotating magnetic disk or a plurality of radiating spoke-like arms. Thus, the strip of nuts are stored in an installation-ready unconnected manner for dispensing from the tangential passage portion 277 upon the pick-up magnetic arm 280 being rotated in an opposite or clockwise manner by motor 282 to be described.

Figure 15:
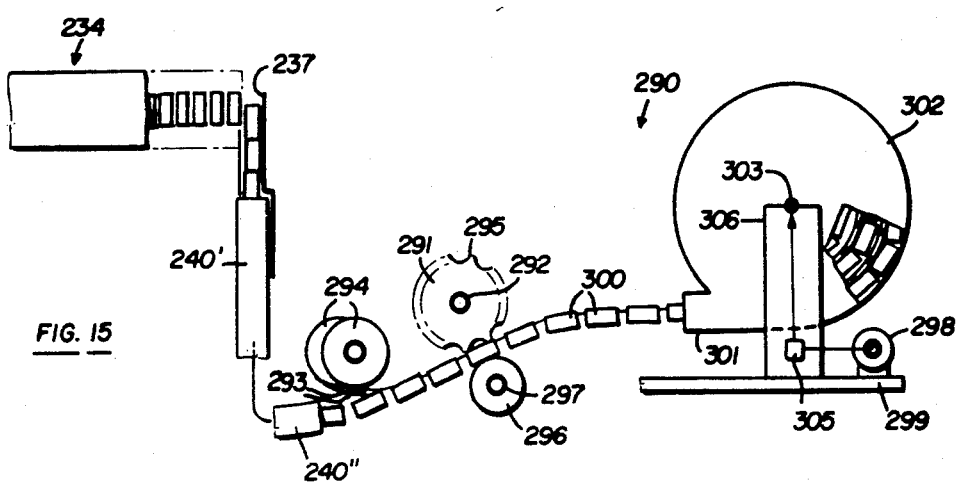
FIG. 15 is a view similar to FIG. 14 showing a wire connected nut collection reel apparatus.

FIG. 15 illustrates somewhat schematically a modified nut loading and storage arrangement 290 wherein the nuts are fed by means of the vertical nut-delivery chute 240' via its lower angled portion 240" to a nut strip forming apparatus of the type disclosed in U.S. Pat. No. 3,711,931 of Ladouceur et al, assigned to the Assignee of the present application. In this embodiment motor driven paired knurling tools 291, mounted on shaft 292, are rolled over paired wires 293 from freely rotatable spools 294 to deform the bottom of the pierce nut by radially extending teeth 295 and retain the wires in the coaxially aligned nut grooves 34. A back-up or support roller 296 is shown mounted on shaft 297. The knurling tools shaft 292 is driven by motor 298 supported on base support 299. The pre-oriented nut strip 300 is then fed through a tangential spool feed chute 301 by the knurling means and coiled in a motor driven rotating reel or spool 302 in a conventional manner as shown in the mentioned U.S. Pat. No. 3,711,931. The spool 302 is mounted on a motor shaft 303 which is driven by the motor 298 and clutch mechanism 305. A riser 306 on base support 299 supports the spool shaft 303.

The preoriented nut strip 300 is then coiled by the motor driven nut coil spool 302. As explained in the mentioned U.S. Pat. No. 3,845,860, the spool 302 is driven by the motor 298 through the clutch mechanism 305, operative to prevent pulling apart or deformation of the nut coil strip 300. It will be noted that the preoriented nut strip 300 is coiled with the retaining wires 293 at the inner end of the pierce nuts, adjacent the shaft 303. When the strips of nuts 300 is coiled in reel 302, the motor is stopped and the reel 302 is delivered to an installation station in the same manner as reel 278.

Figure 16:
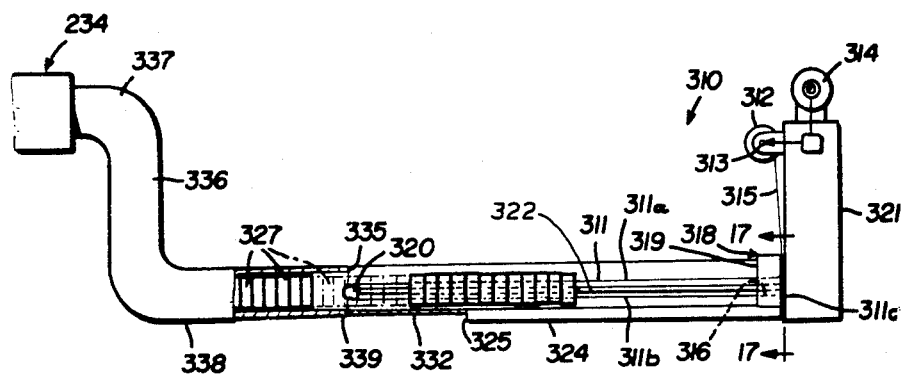
FIG. 16 is a view similar to FIG. 14 showing a partially schematic representation of an elongated linear wire loop nut strip collection apparatus.

FIG. 16 illustrates somewhat schematically still another nut receiving and collection arrangement of the present invention wherein the nuts are fed from the machine discharge conveyor 234 aligned on the feed axis of the machine. The nuts are received by linear nut collection means, generally indicated at 310, including a wire loop 311 that is reeled from a rotatable wire spool 312 supported on shaft 313 driven by motor 314 to coiled wire 315 thereon.

The wire 315 is fed from the spool 312 with wire loop first upper return portion 311a extending through central aperture 316 of nut dispensing or unloading means in the form of the flexible wire loop 311 and a pusher block 318. The block has a central aperture 316 and is slidably supported in a U-shaped channel member 330 for reciprocal travel therein. The block outer face 319 is operative to engage a first nut of a string or stack of nuts received on the wire loop. The wire 315, for example a 0.029 in diameter music wire, has a bight portion looped over a fixed wire guide 320 and a second lower return wire portion 311b extending through the pusher block aperture 316 for anchoring to fixed support riser 321 at 311c.

In the disclosed form the wire guide portion 320 is supported at the free end of a cantilevered support means. In the disclosed embodime;nt, the guide support means is an elongated self-supporting rod 322. The rod 322 has its opposite end suitably fixed to the riser 321 of a support base 324. The guide member is located in juxtaposition to the exit 335 of chute means 336 for slidably receiving each bore of the string of nuts advanced by gravity flow from the discharge conveyor 234. Thus, a predetermined string or stack of nuts is received on the wire loop upper and lower linear return portions 311a and 311b.

Figure 17:
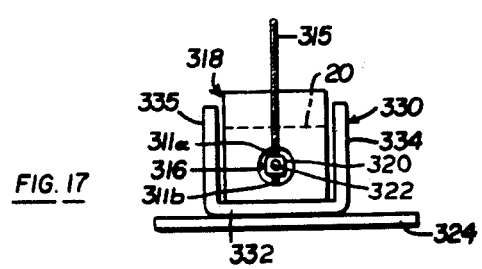
FIG. 17 is an enlarged vertical sectional view taken on the line 17—17 of FIG. 16.

With reference to FIG. 17, it will be seen that a longitudinally extending nut alignment means in the form of channel 330 is provided for the linear nut collection means 310 having its planar bottom 332 supported on base 324 so as to extend beyond the free edge 325 of the base. The channel 330 has a generally U-shaped configuration defined by a pair of vertical walls 334, 335 and the bight or bottom 332 therebetween spaced to receive a string or stack of nuts 327 being advanced from a double-L configured means 336. The double-L chute has an upper short length curved portion 337 for receiving the string of nuts 327 in face-to-face spaced array from the machine feed path. The string of nuts is fed by gravity or powered by rollers 244 in face-to-face abutting array through a lower horizontally disposed short curved portion 338 such that each nut pushes the nut ahead of itself in a sliding manner for sliding reception of the nut bores on guide portion 320 extending beyond the outer open end 339 of the channel 330. By virtue of the arrangement the stack of nuts 327 are maintained in face-to-face abutting array by being received in the outer open end 339 of the U-shaped channel 330. Thus, with the block 318 positioned as shown in FIG. 16, a full stack of nuts will be loaded and stored on the cantilevered rod 322. It will be noted that the linear nut collection means 310 could be oriented to extend at an inclined angle to the horizontal to increase the gravitational flow if desired.

Figure 18:
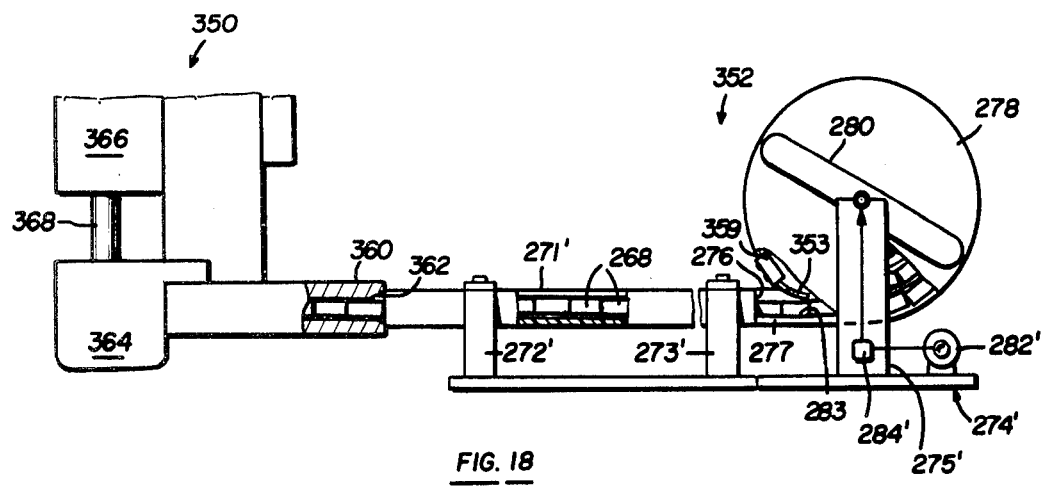
FIG. 18 is a partially schematic view of the nut collection apparatus of FIG. 14 feeding nuts to a nut installation head.
Figure 19:
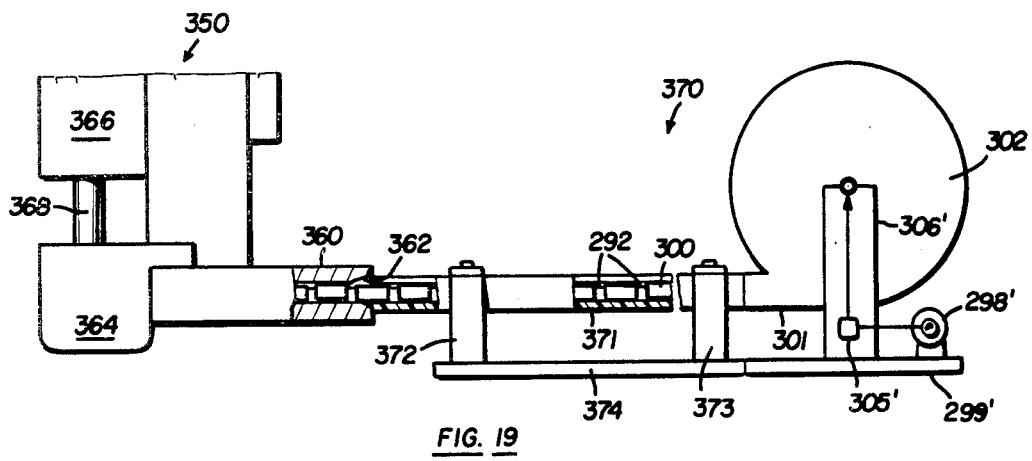
FIG. 19 is a view similar to FIG. 18 showing the nut collective apparatus of FIG. 15 feeding nuts to a nut installation head.

Turning now to FIGS. 18 and 19, there are shown two arrangements for delivering a strip of nuts in an installation-ready predetermined quantity to a nut installation or attaching head assembly indicated generally a 350. An example of an installation head is shown and described in the Ladouceur U.S. Pat. No. 3,711,931.

With respect to FIG. 18, the loaded nut collection reel or spool 278 is removed from the reeler support riser 275 and transported to a support riser 275' of a de-reeler adapted to unwind the coiled unattached strip of nuts 268 from the reel 278. As nut delivery de-reeler means 352 is substantially identical to the nut collection reeler 270 with primed numerals designating like or corresponding parts.

The de-reeler means 352 operates to unwind the coiled unconnected strip of nuts 267 from the spool 278 by rotating the magnetic pickup arm 280 in a clockwise direction. A guide plate or finger 353 is supported in the spool tangent passage by means of block 359 in a manner similar to a guide finger shown in U.S. Pat. No. 3,334,724 assigned to the assignee of the present invention. The finger 353 is arched or inclined to extend downwardly toward the spiral track access oepning 283. The guide finger is positioned to engage each nut exiting opening 283 to insure its separation from the magnetic attraction of the rotating member 280.

The strip of nuts are advanced through the tangent chute portion 277 into horizontally disposed chute 271' extending through a first guide 273' and a second guide 272' to feed block 360, which includes a tapered inlet opening 362 for reception of the string of nuts 268 in lower housing assembly 364. Upper housing assembly 366 and guide post assembly 368 are shown in outline to indicate their location.

With reference to FIG. 19, the double wire feeding arrangement is generally shown and described in the above mentioned U.S. Pat. No. 3,845,860 Ladouceur et al. Upon the nut strips 300 being loaded, the reel 302 may be moved to a de-reeler 370. The head may include a feed means, not shown, which feeds nuts in the strip to the plunger. Paired wire 292 connected nuts are advanced into tangent chute 301 and through chute 371. The chute 371 extends through guides 372 and 373 supported on base 374 to inlet opening 362 of the head assembly 350.

Figure 20:
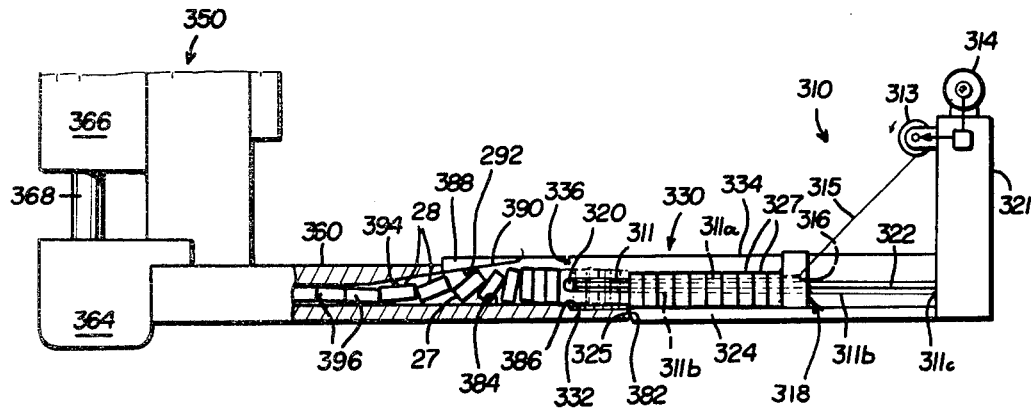
FIG. 20 is a view similar to FIG. 18 showing the nut collection apparatus of FIG. 16 in its nut feeding mode for feeding nuts to a nut installation head.

FIG. 20 shows the delivery mode of the linear nut collection means or assembly 310 of FIGS. 16 and 17. In this form of the invention the assembly 310 is transported on the base support 324 to the installation head 350 with the edge 325 of base in abuttment with free edge 382 of work surface 384. Thus, the channel bottom 332 is located in recessed area 386 to allow the nuts to be advanced from the outer open end 336 of the channel 330 for sliding reception on the work surface 384.

The nuts are advanced by motor 314 rotating wire coil shaft 313 to cause the pusher block 318 to travel toward the left in the channel 330. The string of nuts 327 are slidably removed from the channel 330 and the wire loop 311 and advanced with their side faces 27 being received on the work surface 384 and the nuts in face-to-face abutting array. The work surface 384 includes side wall means one of which is shown at 388, defining a nut feed channel to maintain the string of nuts in alignment on work surface 384.

An upwardly and outwardly inclined head camming or guide plate 390 is provided between the walls 388. The inclined surface 292 of guide plate 390 engages each nut upper lead horizontal edge causing each nut to be tilted in succession about its lower horizontal trailing edge and tipped over. In this manner, the unconnected nuts are fed into passage inlet 394 in side-to-side abutting array as a strip of nuts 396 with each nut pilot face 23 placed in sliding contact with the work surface 384. The linear feeding system and method of this invention eliminates the requirement of nut connecting means at the installation site which is advantageous for jam free operation of the nut installation head apparatus.

We claim:

1. In a machine for orienting, tapping and collecting a group of nuts aligned for subsequent delivery to a nut installation means in installation-ready array, each nut having generally flat polygonal end faces, a nut bore extending through said end faces, and flange portions extending from opposite sides of the nut adjacent one end face, the machine comprising:
   (a) first conveyor means for advancing said nuts in end face to end face array in a longitudinal feed path;
   (b) elongated rod means aligned on said feed path receiving said nut bores including a tapping means forming a female thread in said nut bores, said rod means rotatably journaled and supported on said feed path by means of the randomly oriented nuts advancing on said rod means;
   (c) nut orienting means successively receiving said randomly oriented nuts in end face to end face array, said nut orienting means rotating said nuts about the longitudinal axis of said feed path and orienting said nuts in said array with said flange portions aligned in parallel planes; and,
   (d) collection means collecting said aligned nuts in a second path transverse to said feed path in side to side abutting installation-ready array and separating groups of said aligned nuts for subsequent installation.

2. The machine for orienting, tapping and collecting a group of nuts as defined in claim 1, characterized in that said collection means includes magnetic means operative to be rotated in one direction for advancing the strip of nuts onto a spiral track by magnetic attraction for retaining the separated strip of nuts on coiled uncollected installation-ready side to side abutting array and said magnetic means operative to be rotated in the opposite direction for advancing the coiled strip of unconnected nuts from said spiral track by magnetic attraction delivering the aligned strip of unconnected nuts in side to side abutting array to a nut installation means.

3. The machine for orienting, tapping and collecting a group of nuts as defined in claim 1, characterized in that said collection means includes a means joining the separated strip of nuts by readily frangible connector means interconnecting adjacent nuts aligned in side to side abutting array and coiling said nuts in a continuous coil of interconnected nuts.

4. In a continuous method of orienting, tapping and collecting a group of nuts for delivery in installation-ready serial array to a nut installation means, each nut having a body portion including generally polygonal end faces, flanged portions extending from opposed sides of said nut with the opposite sides being generally flat and a central bore extending through each nut body portion generally perpendicular to said end faces, the method comprising the following steps:
   (a) advancing a group of nuts along a longitudinal feed path with the nut bores coaxially aligned and the sides in random angular relation;
   (b) advancing and orienting said group of nuts by successively rotating each nut about the longitudinal axis of said feed path, with each successive nut arranged on the feed path in face to face abutting array and orienting said flange portions in serial parallel alignment;
   (c) tapping the bore of each nut as the group of nuts are advanced on said feed path;
   (d) advancing said nuts in a second path transverse to said feed path in side to side installation-ready abutting array with said flanges extending perpendicular to said second path; and, (e) separating groups of aligned nuts from said second path for subsequent delivery to a nut installation means.

5. The method of orienting, tapping and collecting a group of nuts as defined in claim 4, including collecting said separated group of aligned nuts in an unconnected spiral coil of nuts for subsequent delivery to a nut installation means.

6. The method of orienting, tapping and collecting a group of nuts as defined in claim 4, including joining said separated group of aligned nuts by readily frangible connector means interconnecting adjacent nuts to one another in said side to side installation-ready abutting array.

* * * * *